(12) United States Patent
Liu et al.

(10) Patent No.: US 12,529,555 B2
(45) Date of Patent: Jan. 20, 2026

(54) PHASE UNWRAPPING METHOD BASED ON MULTI-VIEW CONSTRAINTS OF LIGHT FIELD AND RELATED COMPONENTS

(71) Applicant: SHENZHEN UNIVERSITY, Guangdong (CN)

(72) Inventors: Xiaoli Liu, Guangdong (CN); Quanyao Hou, Guangdong (CN); Yang Yang, Guangdong (CN); Ziwei Wang, Guangdong (CN); Qijian Tang, Guangdong (CN); Xiang Peng, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 319 days.

(21) Appl. No.: 18/199,358

(22) Filed: May 18, 2023

(65) Prior Publication Data
US 2023/0384085 A1    Nov. 30, 2023

(30) Foreign Application Priority Data
May 30, 2022  (CN) .......................... 202210601930.7

(51) Int. Cl.
*G01B 11/25* (2006.01)
(52) U.S. Cl.
CPC ...... *G01B 11/2527* (2013.01); *G01B 11/2504* (2013.01); *G01B 11/2545* (2013.01)
(58) Field of Classification Search
CPC .. G06T 7/557; G06T 7/55; G06T 7/73; G06T 7/80; G06T 2207/10052;
(Continued)

(56) References Cited

U.S. PATENT DOCUMENTS

2021/0357622 A1* 11/2021 Keinert ..................... G06T 7/50

FOREIGN PATENT DOCUMENTS

CN    112556602 A  *  3/2021   ......... G01B 11/2527

OTHER PUBLICATIONS

Ishiyama et al, Absolute phase measurements using geometric constraints between multiple camera and projectors, Optical Society of America, 2007 (Year: 2007).*

(Continued)

*Primary Examiner* — Uzma Alam
(74) *Attorney, Agent, or Firm* — Li & Cai Intellectual Property Office

(57) ABSTRACT

The present disclosure provides a phase unwrapping method based on multi-view constraints of a light field and related components. The method includes: sampling main view phases at different depths in a measurement scene; performing polynomial calibration on a mapping relation from the main view phase to the pixel coordinates of the corresponding points in auxiliary view images; calculating a candidate absolute phase set of each pixel in a main view image; traversing the candidate absolute phase set, calculating an error value between the candidate absolute phase set and wrapped phases of the pixel coordinates of the corresponding points in all the auxiliary view images by utilizing a calibrated mapping relation, and taking a candidate phase corresponding to the minimum error value as an absolute phase of each pixel in the main view image. The present disclosure can stably realize accurate phase unwrapping of the structured light field.

8 Claims, 3 Drawing Sheets

(58) Field of Classification Search
CPC .......... G06T 2207/30244; G01B 11/25; G01B 11/2527; G01B 11/2504; G01B 11/2545
See application file for complete search history.

(56) References Cited

OTHER PUBLICATIONS

Wang et al, Light-field-assisted phase unwrapping of fringe projection profilometry, IEEE Access, Apr. 6, 2021 (Year: 2021).*

* cited by examiner

PHASE UNWRAPPING METHOD BASED ON MULTI-VIEW CONSTRAINTS OF LIGHT FIELD AND RELATED COMPONENTS

CROSS REFERENCE TO RELATED APPLICATIONS

The present application claims the benefit of Chinese Patent Application No. 202210601930.7 filed on May 30, 2022, the contents of which are incorporated herein by reference in their entirety.

TECHNICAL FIELD

The present disclosure relates to the technical field of light field imaging, and in particular to a phase unwrapping method based on multi-view constraints of a light field and related components.

BACKGROUND

Light field imaging can record the intensity information and direction information of light rays at the same time through single-frame exposure, and has the ability to calculate the three-dimensional shape of a scene.

The passive light field depth estimation technique does not need to project active illumination, but only needs single exposure imaging on the scene performed by a light field imaging system, so that the depth information of the scene can be recovered from light field data by utilizing an algorithm. The technique has the advantages of flexibility, high efficiency, and applicability to dynamic scenes, but has the disadvantages of low accuracy and poor stability. With respect to these disadvantages, the researchers introduced structured light illumination technology based on phase coding into the light field imaging to realize active light field imaging, which can greatly improve the accuracy of depth estimating.

Active structured light field imaging performs phase encoding on the scene, and recovers phase information modulated by the depth of the scene from a collected fringe image through calculation. This process needs to unwrap the wrapped phase obtained by demodulation; a commonly used phase unwrapping method includes temporal phase unwrapping and spatial phase unwrapping. The former determines the order of the wrapped phase by projecting additional encoding to an object to be detected, so as to realize phase unwrapping, but needs to project additional encoding images to the scene, which loses the applicability to the dynamic scenes. The latter only needs to perform calculation by algorithm on the wrapped phase, without the need of projecting the additional encoding, and guides the phase unwrapping according to a phase relation between neighborhood pixels in a wrapped phase image. However, the spatial phase unwrapping cannot obtain an accurate order because of being likely to be affected by factors such as noises and complex detailed shapes. Moreover, after such method has an unwrapping error, its error will be accumulated and delivered, influencing subsequent unwrapping results.

In addition, the researchers have proposed a method for phase unwrapping of a structured light field. This method judges the correct order through multi-step mapping to realize the phase unwrapping, but this method needs to perform multi-step calibration, and also needs to perform multi-step mapping calculation during the phase unwrapping. The algorithm flow is relatively complex and tedious and there is a case of error delivery and accumulation in the multi-step mapping calculation, reducing the accuracy of the phase unwrapping.

SUMMARY

The present disclosure is intended to provide a phase unwrapping method based on multi-view constraints of a light field, which aims to solve the problem that an existing phase unwrapping method for a structured light field still needs to be improved.

In a first aspect, an embodiment of the present disclosure provides a phase unwrapping method based on multi-view constraints of a light field, including:

a calibration step:
sampling main view phases and auxiliary view phases at different depths in a measurement scene through a structured light field system, specifically including: sampling a phase of each pixel in a main view image at each depth and a phase of each pixel in one or more auxiliary view images;
acquiring pixel coordinates of corresponding points of the main view phase at each depth in all the auxiliary view images by utilizing a phase consistency principle, so as to obtain a mapping sample set at each depth, and performing polynomial calibration on a mapping relation from the main view phase to the pixel coordinates of the corresponding points in all the auxiliary view images by using the mapping sample set;
calculating a candidate order range of each pixel in the main view image according to sampled data;
performing the following calculation steps of phase unwrapping after sampling calibration is completed:
calculating according to the candidate order range and obtaining a candidate absolute phase set of each pixel;
according to the candidate absolute phase set of each pixel in the main view image, and on the basis of the calibrated mapping relation from the main view phase to the pixel coordinates of the corresponding points in all the auxiliary view images, traversing and calculating pixel coordinates of corresponding points of each candidate absolute phase of the candidate absolute phase set in all the auxiliary view images; and
traversing the candidate absolute phase set of each pixel in the main view image, calculating an error value between the candidate absolute phase set and wrapped phases of the pixel coordinates of the corresponding points in the auxiliary view images, and taking a candidate phase corresponding to the minimum error value as an absolute phase of each pixel in the main view image.

In a second aspect, an embodiment of the present disclosure provides a computer device, including a memory, a processor, and a computer program stored in the memory and capable of running on the processor, where when executing the computer program, the processor realizes the phase unwrapping method based on multi-view constraints of a light field according to the first aspect.

In a third aspect, an embodiment of the present disclosure provides a computer-readable storage medium, where the computer-readable storage medium stores a computer program; and when executed by a processor, the computer program causes the processor to perform the phase unwrapping method based on multi-view constraints of a light field according to the first aspect.

The embodiment of the present disclosure provides a phase unwrapping method based on multi-view constraints of a light field and related components. This method includes two parts of calibration and unwrapping calculation. The calibration part includes: sampling main view phases and auxiliary view phases at different depths in a measurement scene through a structured light field system; acquiring pixel coordinates of corresponding points of the main view phase at each depth in all auxiliary view images by utilizing a phase consistency principle, and performing polynomial calibration on a mapping relation from the main view phase to the pixel coordinates of the corresponding points in the auxiliary view images; and calculating a candidate order range of each pixel in the main view image. The unwrapping calculation part includes: calculating a candidate absolute phase set of each pixel in the main view image by utilizing sampled data; and then, traversing the candidate absolute phase set, calculating an error value between the candidate absolute phase set and wrapped phases of the pixel coordinates of the corresponding points in all the auxiliary view images by utilizing the calibrated mapping relation, and taking a candidate phase corresponding to the minimum error value as an absolute phase of each pixel in the main view image. The embodiments of the present disclosure do not need to project additional encoding images, and have the advantage of capability of stably realizing accurate phase unwrapping of the structured light field.

BRIEF DESCRIPTION OF THE DRAWINGS

To illustrate the technical solutions in the embodiments of the present disclosure more clearly, the following briefly describes the accompanying drawings required for describing the embodiments. The drawings that need to be used in the description of the embodiments will be briefly introduced below, and a person of ordinary skill in the art may still derive other accompanying drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the disclosed embodiments without creative efforts shall fall within the protection scope of the present disclosure.

Figure 1:
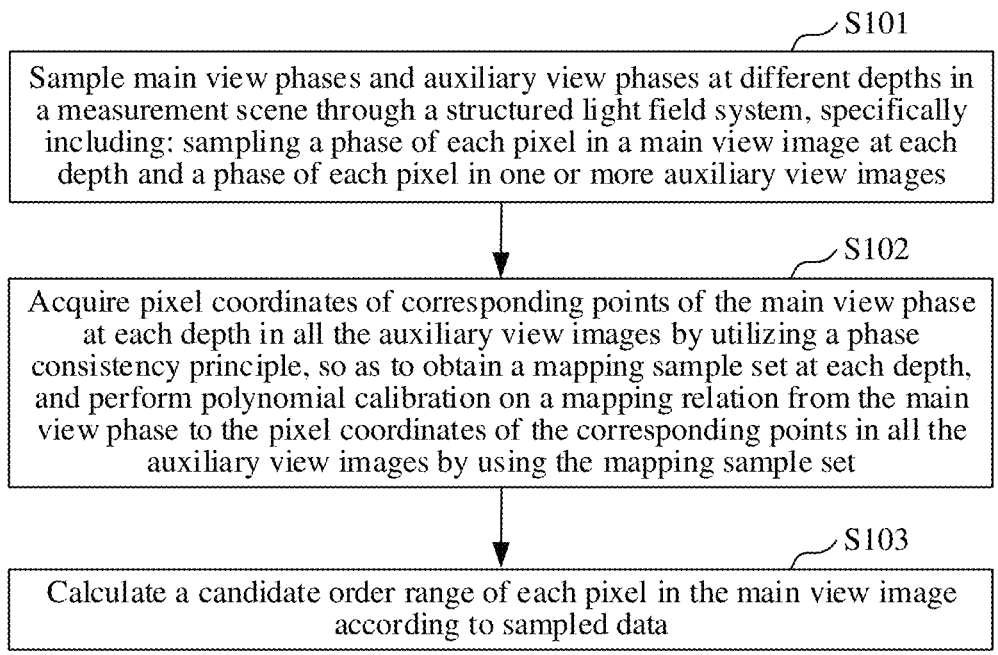
FIG. 1 is a schematic flowchart of a coefficient calibration method based on multi-view constraints of a light field provided by an embodiment of the present disclosure.

With reference to FIG. 1, FIG. 1 is a schematic flowchart of a coefficient calibration method based on multi-view constraints of a light field provided by an embodiment of the present disclosure.

As shown in FIG. 1, the method includes calibration steps S101 to S103.

S101: sampling main view phases and auxiliary view phases at different depths in a measurement scene through a structured light field system, specifically including: sampling a phase of each pixel in a main view image at each depth and a phase of each pixel in one or more auxiliary view images.

Specifically, step S101 includes:

placing a plane target at different depths in a measurement space of the structured light field system.

Figure 2:
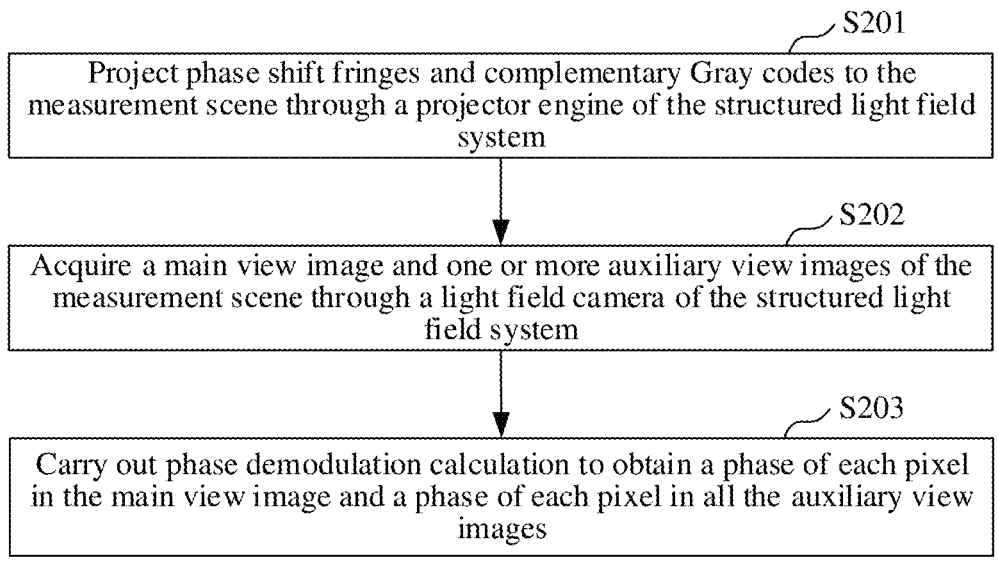
FIG. 2 is a schematic sub-flowchart of step S101 provided by an embodiment of the present disclosure.

For each depth, as shown in FIG. 2, performing phase sampling flows of steps S201 to S203:

S201: projecting phase shift fringes and complementary Gray codes to the measurement scene through a projector engine of the structured light field system.

S202: acquiring a main view image and one or more auxiliary view images of the measurement scene through a light field camera of the structured light field system.

S203: calculating by utilizing a phase calculation method and obtaining a phase of each pixel in the main view image and a phase of each pixel in all the auxiliary view images.

In this embodiment, the white plane target is placed at one depth of the measurement scene, and then, the phase shift fringes and the complementary Gray codes are projected to the measurement scene through the projector engine. Then, sub-aperture images of the measurement scene at multiple views are acquired by the light field camera, where the sub-aperture image at one view is used as the main view image and the sub-aperture images at the other views are used as the auxiliary view images. Finally, the phase of each pixel in the main view angle and the phase of each pixel in all the auxiliary view images at the current depth are calculated and solved by a phase shift method and a complementary Gray code phase demodulation method.

Figure 4:
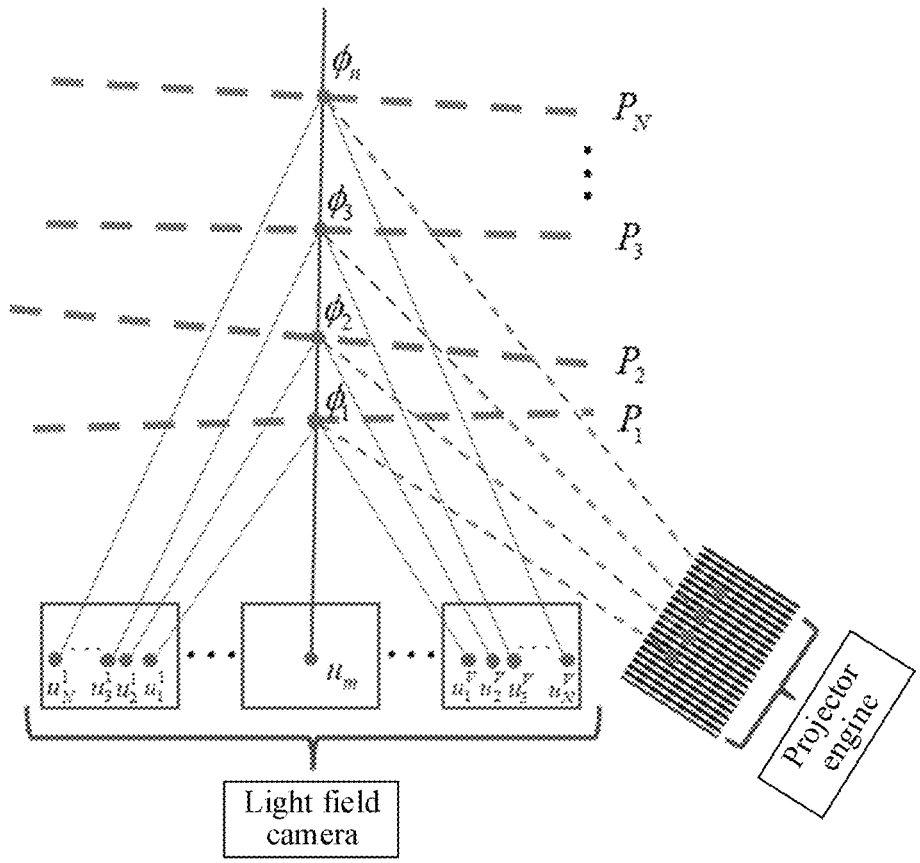
FIG. 4 is a schematic diagram of acquiring phase distribution by a structured light field system provided by an embodiment of the present disclosure.

Depth positions (different depth positions $P_1$-$P_N$ as illustrated in FIG. 4) of the plane target in the measurement scene are changed, and the main view phases and the auxiliary view phases at different depths in the measurement scene of the structured light field system can be obtained by repeated calculation.

S102: acquiring pixel coordinates of corresponding points of the main view phase at each depth in all the auxiliary view images by utilizing a phase consistency principle, so as to obtain a mapping sample set at each depth, and performing polynomial calibration on a mapping relation from the main view phase to the pixel coordinates of the corresponding points in all the auxiliary view images by using the mapping sample set.

Specifically, step S102 includes:

acquiring a candidate phase $\phi$ of a single pixel in the main view image at each depth by utilizing the phase consistency principle, so as to obtain a single mapping sample $\{\phi \mapsto u^i | i=1, 2, \ldots, V\}$ where $u^i$ represents the pixel coordinate of the corresponding point in the $i^{th}$ auxiliary view image, and V represents the number of pixels of the auxiliary view image.

Obtaining a mapping sample set $\{\phi_n \mapsto \{u\}_n | n=1, 2, \ldots, N\}$ at each depth on the basis of all pixels in the main view image at each depth, where n represents a serial number of a data sample, and N represents the number of auxiliary views employed.

Performing polynomial calibration on a mapping relation from the main view phase to the pixel coordinates of the corresponding points in all the auxiliary view images according to the following formula, and obtaining a polynomial coefficient $d_n$:

$$u^i = f_{u^i}(\phi_m) = \sum_{n=0}^{N} d_n \phi_m^n;$$

where $u^i$ represents the pixel coordinate of the corresponding point in the $i^{th}$ auxiliary view image, $f_{u^i}(\phi_m)$ represents mapping a main view absolute phase to a candidate absolute phase of the pixel in the main view image corresponding to $u^i$ of a corresponding point coordinate of the $i^{th}$ auxiliary view, and $\phi_m^n$ represents the candidate absolute phase of the $n^{th}$ pixel in the main view image.

In this embodiment, according to structural properties of the light field camera and a formation manner for an epipolar plane image (EPI), with respect to a certain determined pixel in the main view image, there is a monotonic mapping relation between its pixel coordinates $u^i$ of the corresponding points in the auxiliary view images and the depth, which can be represented as $D \mapsto u^i$; $\phi_m \mapsto u^i$ can be obtained based on a non-linear monotonic relation $\phi_m \mapsto D$ between the depth and the absolute phase, which indicates that there is a monotonic mapping relation between the absolute phase of a certain pixel in the main view image and the pixel coordinates of the corresponding points of auxiliary views; all different auxiliary view images are calibrated by utilizing the above formula; and the value of the polynomial coefficient do can be obtained by substituting all parameters into the above calibration formula for calculation.

S103: calculating a candidate order range of each pixel in the main view image according to sampled data.

It specifically includes:

acquiring measurement depths of the structured light field system to obtain a depth range.

Obtaining the candidate order range according to the non-linear monotonic relation between the depth and the absolute phase and a corresponding relation between different absolute phases and different orders.

In this embodiment, the depth range $[D^{min}, D^{max}]$ can be obtained due to the depth of field ranges of the projector engine and the light field camera in a light field imaging system; the candidate order range is obtained according to the non-linear monotonic relation $\phi_m \mapsto D$ between the depth and the absolute phase and the corresponding relation between the different absolute phases and the different orders. Specifically, it can be understood that: according to the sampled data, that is, the known depth range of the structured light field system, different depths correspond to different absolute phase values, and the different absolute phase values correspond to the different orders, and therefore, a limited range of measurement depths reflects the limited number of orders, that is, the candidate order range $[K^{min}, K^{max}]$.

On the basis of a calibration process of the above steps S101 to S103, enough samples can be obtained to facilitate subsequent phase unwrapping calculation.

Figure 3:
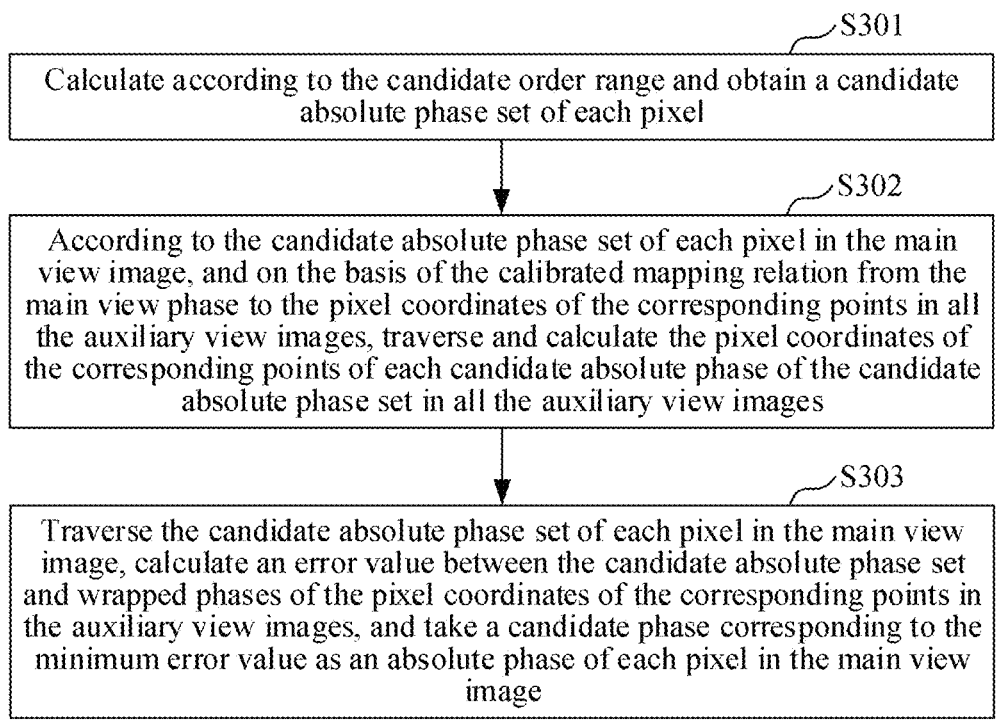
FIG. 3 is a schematic flowchart of a phase unwrapping calculation method based on multi-view constraints of a light field provided by an embodiment of the present disclosure.

With reference to FIG. 3, FIG. 3 is a schematic flowchart of a phase unwrapping calculation method based on multi-view constraints of a light field provided by an embodiment of the present disclosure.

As shown in FIG. 3, phase unwrapping calculation steps S301 to S303 are performed for phase distribution at each depth:

S301: calculating according to the candidate order range and obtaining a candidate absolute phase set of each pixel.

S302: according to the candidate absolute phase set of each pixel in the main view image, and on the basis of the calibrated mapping relation from the main view phase to the pixel coordinates of the corresponding points in all the auxiliary view images, traversing and calculating the pixel coordinates of the corresponding points of each candidate absolute phase of the candidate absolute phase set in all the auxiliary view images.

S303: traversing the candidate absolute phase set of each pixel in the main view image, calculating an error value between the candidate absolute phase set and wrapped phases of the pixel coordinates of the corresponding points in the auxiliary view images, and taking a candidate phase corresponding to the minimum error value as an absolute phase of each pixel in the main view image.

In this embodiment, the phase unwrapping calculation method of steps S301 to S303 is performed for the phase distribution at each depth. This method does not need to project additional encoding images, carries out phase unwrapping on the main view image by utilizing a wrapped phase consistency principle of multiple views (that is, a main view and all auxiliary views) of a structured light field, and judges with the aid of wrapped phases of the other auxiliary views to achieve the accuracy of phase unwrapping.

The specific process of the phase unwrapping calculation is described below:

in one embodiment, step S301 includes:

calculating candidate absolute phases $\phi_m$ at different candidate orders according to the following formula:

$$\phi_m = \varphi_m + 2\pi K;$$

where $\varphi_m$ represents wrapped phases of pixels in the main view image, and K represents different candidate orders.

Obtaining a candidate absolute phase set $\{\phi_k = k \in [K^{min}, K^{max}]\}$ on the basis of each candidate order, where k represents the $k^{th}$ order.

In this embodiment, the limited number of candidate absolute phases can be obtained by combining different candidate orders K with the wrapped phases of the pixels in the main view image. The candidate absolute phase set can be obtained by gathering all the candidate absolute phases at each candidate order.

In one embodiment, step S302 includes:

on the basis of the above calibration formula $$u^i = f_{u^i}(\phi_m) = \sum_{n=0}^{N} d_n \phi_m^n,$$

traversing and calculating the pixel coordinates of the corresponding points of each candidate absolute phase of the candidate absolute phase set in all the auxiliary view images by using the calibrated polynomial coefficient $d_n$.

In this embodiment, after the aforementioned calculated and obtained polynomial coefficient $d_n$ is substituted into the above formula, the candidate absolute phases of the pixels in the main view image can be calculated through the mapping relation to obtain their pixel coordinates of the corresponding points in different auxiliary view images, and the wrapped phases of the pixel coordinates of the corresponding points can be obtained according to the pixel coordinates of the corresponding points in all the auxiliary view images, so as to facilitate error function calculation in the step below.

In one embodiment, step S303 includes:

calculating the error value according to the following error function:

$$E(\phi_m) = \frac{1}{N}\sum_{i=1}^{N}\left(|\varphi_a^i - \varphi_m|\right)$$

where $\varphi_m$ represents the wrapped phase of the pixel coordinate of the corresponding point in the main view image, $\varphi_a^i$ a represents the wrapped phase of the pixel coordinate of the corresponding point of the $i^{th}$ auxiliary view image, and N represents the number of auxiliary views employed.

Taking the candidate phase corresponding to the minimum error value as an absolute phase of each pixel in the main view image.

In this embodiment, during a process of traversing the candidate absolute phase set of each pixel in the main view image, only one corresponding depth in the candidate absolute phase set is a correct object point depth. At this depth, wrapped phase information of a real object point is recorded by the auxiliary view image, and therefore, a correct absolute phase can be determined through the consistency between the wrapped phases of the pixel coordinates in the main view image and the wrapped phases of the pixel coordinates of the corresponding points of the main view image in all the auxiliary view images. The minimum error value specifically can be calculated and obtained by the above error function, that is, the correct absolute phase.

The wrapped phases of the pixel coordinates in the main view image and the wrapped phases of the pixel coordinates of the corresponding points of the main view image in all the auxiliary view images are known numerical matrices, and therefore, the wrapped phases of the pixel coordinates of the main view and the wrapped phases of the pixel coordinates of the corresponding points in all the auxiliary view images can be obtained only if the pixel coordinates in the main view image and the pixel coordinates of the corresponding points of the main view image in all the auxiliary view images are known.

Figure 5:
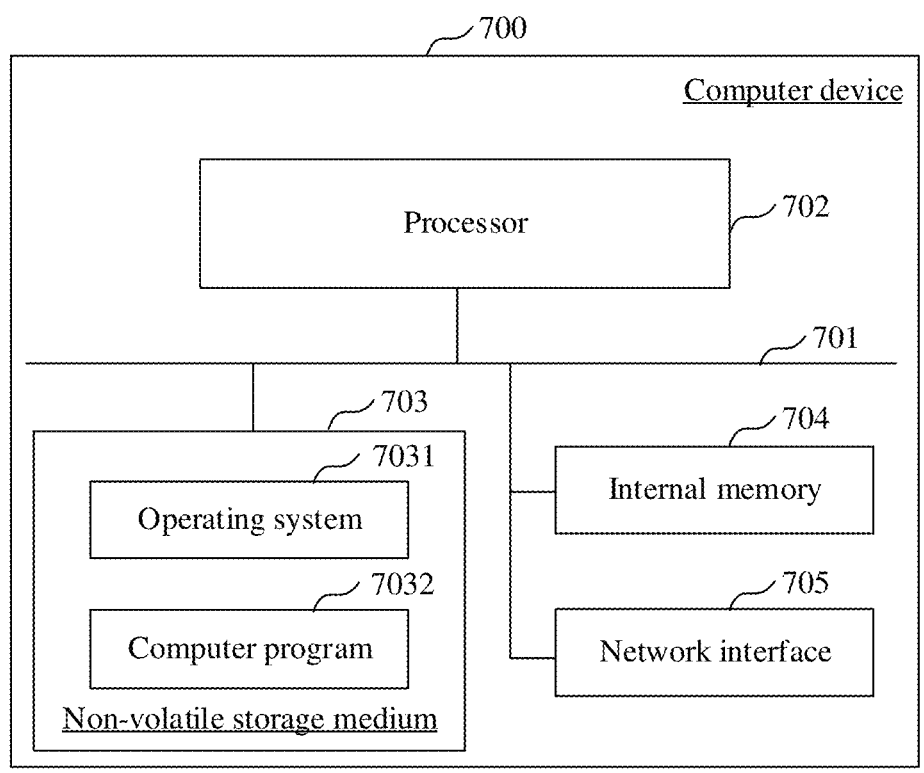
FIG. 5 is a schematic block diagram of a computer device provided by an embodiment of the present disclosure.

The above phase unwrapping device based on multi-view constraints of a light field can be realized in the form of a computer program, and the computer program can be run on a computer device as shown in FIG. 5.

With reference to FIG. 5, FIG. 5 is a schematic block diagram of a computer device provided by an embodiment of the present disclosure. The computer device 700 is a server, and the server may be an independent server and may also be a server cluster composed of a plurality of servers.

With reference to FIG. 5, the computer device 700 includes a processor 702, a memory, and a network interface 705, which are connected through a system bus 701, where the memory may include a non-volatile storage medium 703 and an internal memory 704.

The non-volatile storage medium 703 can store an operating system 7031 and a computer program 7032. When executed, the computer program 7032 can cause the processor 702 to perform the phase unwrapping method based on multi-view constraints of a light field.

The processor 702 is configured to provide computing and controlling capabilities to support the operation of the whole computer device 700.

The internal memory 704 provides an environment for the running of the computer program 7032 in the non-volatile storage medium 703 When executed by the processor 702, the computer program 7032 can cause the processor 702 to perform the phase unwrapping method based on multi-view constraints of a light field.

The network interface 705 is configured to perform network communication, such as providing transmission of data information. A person skilled in the art can understand that the structure shown in FIG. 5 is only a block diagram of a part of the structure related to the solution of the present disclosure and does not constitute a limitation on the computer device 700 to which the solution of the present disclosure is applied. Specifically, the computer device 700 may include more or less parts than that shown in the figures, combine some parts, or have different part arrangements.

A person skilled in the art may understand that the embodiments of the computer device shown in FIG. 5 do not constitute a limitation on a specific constitution of the computer device. In other embodiments, the computer device may include more or less parts than that shown in the figure, combine some parts, or have different part arrangements. For example, in some embodiments, the computer device can only include the memory and the processor. In such embodiments, the structures and functions of the memory and the processor are the same as those in the embodiment shown in FIG. 5. Details are not described herein again.

It should be understood that the processor 702 may be a central processing unit (CPU), and the processor 702 may also be another general-purpose processor, a digital signal processor (DSP), an application specific integrated circuit (ASIC), a field-programmable gate array (FPGA) or another programmable logic device, a discrete gate, a transistor logic device, a discrete hardware component, etc. Among them, the general-purpose processor can be a microprocessor, or the processor can be any conventional processor, or the like.

Another embodiment of the present disclosure provides a computer-readable storage medium. The computer-readable storage medium can be a non-volatile computer-readable storage medium. The computer-readable storage medium stores a computer program. When the computer program is executed by a processor, the phase unwrapping calculation method based on multi-view constraints of a light field according to an embodiment of the present disclosure is realized.

The storage medium is a tangible, non-transient storage medium, for example, can be various tangible storage media that can store program code, such as a USB flash drive, a removable hard disk, a read-only memory (ROM), a magnetic disk, or an optical disc.

The foregoing descriptions are merely specific implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the disclosure should be subject to the protection scope of the claims.

What is claimed is:

1. A phase unwrapping method based on multi-view constraints of a light field, comprising:

a calibration step, including:

sampling main view phases and auxiliary view phases at different depths in a measurement scene through a structured light field system, specifically including:

sampling a phase of each pixel in a main view image at each depth and a phase of each pixel in one or more auxiliary view images;

acquiring pixel coordinates of corresponding points of the main view phase at each depth in all the auxiliary view images by utilizing a phase consistency principle, so as to obtain a mapping sample set at each depth, and performing polynomial calibration on a mapping relation from the main view phase to the pixel coordinates of the corresponding points in all the auxiliary view images by using the mapping sample set;

calculating a candidate order range of each pixel in the main view image according to sampled data; and performing the following calculation steps of phase unwrapping after sampling calibration is completed:

calculating according to the candidate order range and obtaining a candidate absolute phase set of each pixel;

according to the candidate absolute phase set of each pixel in the main view image, and on the basis of the calibrated mapping relation from the main view phase to the pixel coordinates of the corresponding points in all the auxiliary view images, traversing and calculating pixel coordinates of corresponding points of each candidate absolute phase of the candidate absolute phase set in all the auxiliary view images; and traversing the candidate absolute phase set of each pixel in the main view image, calculating an error value between the candidate absolute phase set and wrapped phases of the pixel coordinates of the corresponding points in the auxiliary view images, and taking the candidate phase corresponding to the minimum error value as an absolute phase of each pixel in the main view image; and wherein the acquiring pixel coordinates of corresponding points of the main view phase at each depth in all the auxiliary view images by utilizing a phase consistency principle, so as to obtain a mapping sample set at each depth, and performing polynomial calibration on a mapping relation from the main view phase to the pixel coordinates of the corresponding points in all the auxiliary view images by using the mapping sample set includes:

acquiring a candidate phase φ of a single pixel in the main view image at each depth by utilizing the phase consistency principle, so as to obtain a single mapping sample $\{\phi \to u^i | i=1, 2, \ldots, V\}$, wherein $u^i$ represents the pixel coordinate of the corresponding point in the $i^{th}$ auxiliary view image, V represents the number of pixels of the auxiliary view image, and $V \geq i$;

obtaining the mapping sample set $\{\phi_n, \{u\}_n | n=1, 2, \ldots, N\}$ at each depth on the basis of all pixels in the main view image at each depth, wherein n represents a serial number of a data sample, N represents the number of auxiliary views employed, and $N \geq n$; and performing polynomial calibration on the mapping relation from the main view phase to the pixel coordinates of the corresponding points in all the auxiliary view images according to the following formula, and obtaining a polynomial coefficient $d_n$:

$$u^i = f_u^i(\phi_m) = \sum\nolimits_{n=0}^{N} d_n \phi_m^n;$$

wherein ui represents the pixel coordinate of the corresponding point in the $i^{th}$ auxiliary view image, $f_u^i(\phi_m)$ represents mapping a main view absolute phase to a candidate absolute phase of the pixel in the main view image corresponding to $u^i$ of a corresponding point coordinate of the $i^{th}$ auxiliary view, and $\phi_m^n$ represents the candidate absolute phase of the nth pixel in the main view image.

2. The phase unwrapping method based on multi-view constraints of a light field according to claim 1, wherein the sampling main view phases and auxiliary view phases at different depths in a measurement scene through a structured light field system comprises:

placing a plane target at different depths in a measurement space of the structured light field system;

performing the following phase calculation flow for each depth:

projecting phase shift fringes and complementary Gray codes to the measurement scene by a projector engine of the structured light field system;

acquiring a main view image and one or more auxiliary view images of the measurement scene by a light field camera of the structured light field system; and carrying out phase demodulation calculation to obtain a phase of each pixel in the main view image and a phase of each pixel in all the auxiliary view images.

3. The phase unwrapping method based on multi-view constraints of a light field according to claim 1, wherein the calculating a candidate order range of each pixel in the main view image according to sampled data comprises:

acquiring measurement depths of the structured light field system to obtain a depth range; and obtaining the candidate order range according to a nonlinear monotonic relation between the depth and the absolute phase and a corresponding relation between different absolute phases and different orders.

4. The phase unwrapping method based on multi-view constraints of a light field according to claim 1, wherein the calculating according to the candidate order range and obtaining a candidate absolute phase set of each pixel comprises:

calculating candidate absolute phases Om at different candidate orders according to the following formula:

$$\phi_m = \varphi_m + 2\pi K;$$

wherein φm represents wrapped phases of pixels in the main view image, and K represents different candidate orders; and obtaining a candidate absolute phase set $\{\phi_k = k \in [K^{min}, K^{max}]\}$ on the basis of each candidate order, wherein k represents the kth order.

5. The phase unwrapping method based on multi-view constraints of a light field according to claim 1, wherein the according to the candidate absolute phase set of each pixel in the main view image, and on the basis of the calibrated mapping relation from the main view phase to the pixel coordinates of the corresponding points in all the auxiliary view images, traversing and calculating pixel coordinates of corresponding points of each candidate absolute phase of the candidate absolute phase set in all the auxiliary view images comprises:

on the basis of the calibration formula $$u^i = f_u^i(\phi_m) = \sum\nolimits_{n=0}^{N} d_n \phi m^n,$$

traversing and calculating the pixel coordinates of the corresponding points of each candidate absolute phase of the candidate absolute phase set in all the auxiliary view images by using the calibrated polynomial coefficient $d_n$.

6. The phase unwrapping method based on multi-view constraints of a light field according to claim 1, wherein the traversing the candidate absolute phase set of each pixel in the main view image, calculating an error value between the candidate absolute phase set and wrapped phases of the pixel coordinates of the corresponding points in the auxiliary view images, and taking a candidate phase corresponding to the minimum error value as an absolute phase of each pixel in the main view image comprises:

calculating the error value according to the following error function:

$$E(\phi_m) = \frac{1}{N}\sum_{i=1}^{N}\left(\left|\varphi_a^i - \varphi_m\right|\right)$$

wherein $\varphi_m$ represents the wrapped phase of the pixel coordinate of the corresponding point in the main view image, $\varphi_a^i$ represents the wrapped phase of the pixel coordinate of the corresponding point of the $i^{th}$ auxiliary view image, and N represents the number of auxiliary views employed; and taking the candidate phase corresponding to the minimum error value as an absolute phase of each pixel in the main view image.

7. A computer device, comprising a memory, a processor, and a computer program stored in the memory and capable of running on the processor, wherein when executing the computer program, the processor realizes the phase unwrapping method based on multi-view constraints of a light field according to claim 1.

8. A computer-readable storage medium, wherein the computer-readable storage medium stores a computer program; and when executed by a processor, the computer program causes the processor to perform the phase unwrapping method based on multi-view constraints of a light field according to claim 1.

\* \* \* \* \*